United States Patent Office 3,076,546
Patented Feb. 5, 1963

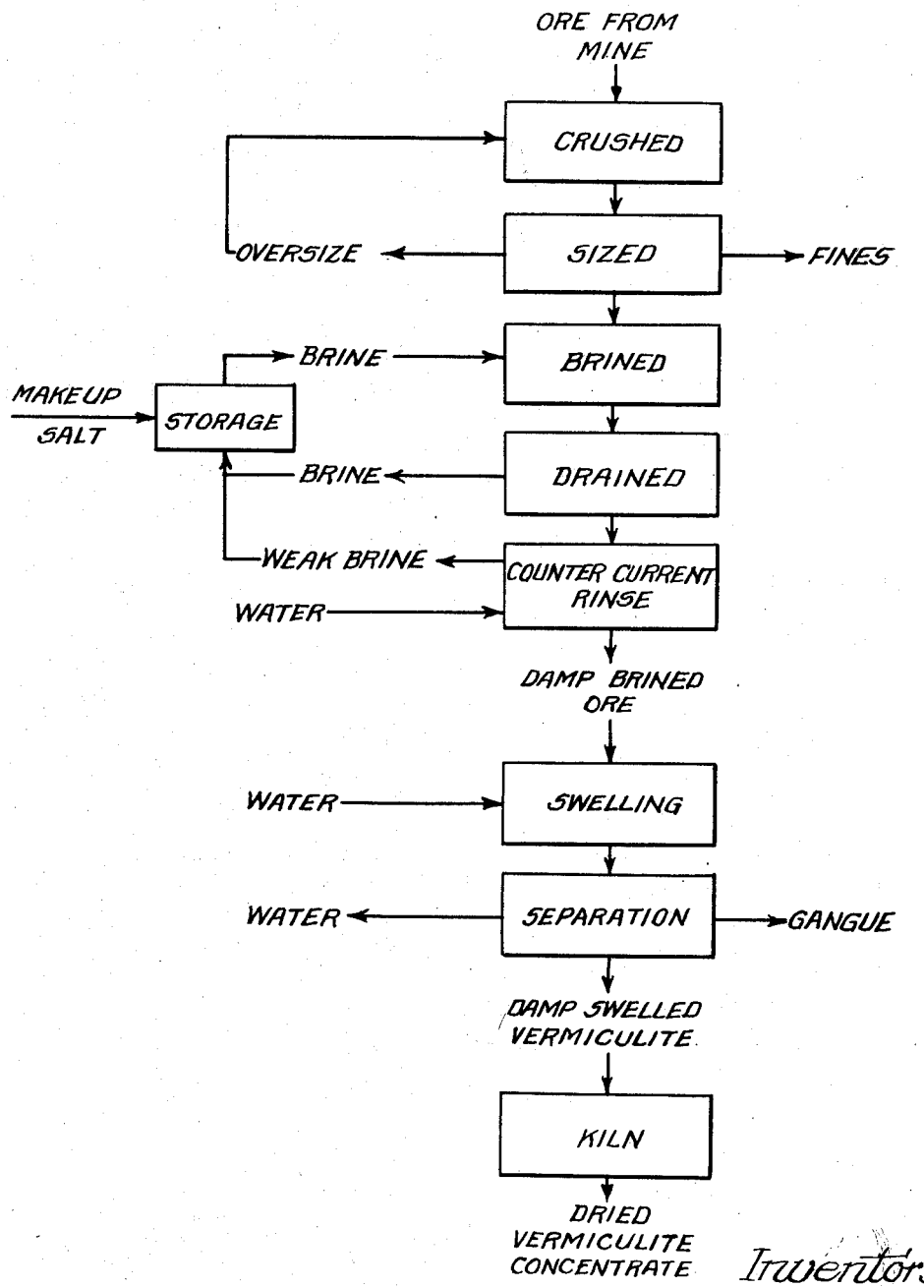

3,076,546
VERMICULITE CONCENTRATION
George E. Ziegler, Evanston, and John C. Hayes, Palatine, Ill., and Antoine M. Gaudin, Newtonville, Mass., assignors to Zonolite Company, Chicago, Ill., a corporation of Montana
Filed Apr. 20, 1959, Ser. No. 807,667
15 Claims. (Cl. 209—2)

This invention relates to a method of processing vermiculite, and more particularly to novel and improved means and method of concentrating or beneficiating the ore, as mined, to remove associated gangue and/or vermiculite of high biotite content, i.e. vermiculite which crystallographically approaches biotite.

Vermiculite is a micaceous mineral, chemically identified as a hydrated magnesium-aluminum-iron silicate and characterized by a platelet structure which exfoliates or expands when heated or subjected to various chemical treatments so as to increase to several times its original size and trap within itself thousands of minutely sized air cells. This mineral occurs naturally; large deposits being found in the United States near Libby, Montana, and Greenville, South Carolina, and in other parts of the world. As mined, the vermiculite ore is usually found in association with such gangue minerals as feldspar, quartz, biotite, epidote, pyroxene, amphole asbestos and various non-expanding micaceous minerals, of which the aforementioned biotite is a prime example.

Prior to the present invention, vermiculite has been beneficiated or separated from its associated gangue minerals by a combination of classification processes dependent on physical differences that could be found between the vermiculite and its associated gangue minerals, such as differences in particle shape and specific gravity. Such classification, however, has not been completely satisfactory from the point of view of obtaining an essentially pure form of vermiculite. Thus, for example, it would be relatively simple to separate feldspar having a specific gravity of about 2.6 from a mixture thereof with hematite (iron oxide) having a specific gravity of about 5.0, through the use of well-known separation processes dependent on existing differences in specific gravity, such as by a jigging or tabling operation, or through the use of heavy media. However, if the feldspar is mixed with pyroxene having a specific gravity of 3.4, separation becomes more difficult; and when feldspar having a specific gravity of 2.6 is found mixed with vermiculite which has a specific gravity varying from 2.3 to 2.7, separation by such technique, for practical purposes, is impossible. What separation is obtainable in these instances has been due almost entirely to the differences in shape which the feldspar and vermiculite take on milling. Thus feldspar usually breaks into roughly equidimensional grains while vermiculite breaks into flat pieces due to its strong basal cleavage.

Asbestos is another gangue mineral found in some crude vermiculite ores which it also has been found difficult to separate from the vermiculite. Asbestos not only has a specific gravity of 2.35 to 2.95 which overlaps the range of specific gravity of the vermiculite, but asbestos also possesses a fibrous structure which gives its particles some of the attributes of settling behavior shown by the flaky micas so that it is not readily separated from vermiculite by reason of any difference in size and shape, and with the result that in gravity separation it has a strong tendency to remain mixed with the vermiculite flakes.

Obviously, the very fact that the specific gravity of vermiculite will vary within the range of about 2.3 to 2.7—instead of being invariant—also contributes to the difficulty met in attempts to separate it from the gangue minerals by gravity concentration processes. This variation in natural specific gravity is apparently due to variations in composition within the mineral itself. Although the mineral as mined in different areas may have exactly the same crystalline character, the chemical elements making up the mineral vary slightly from one crystal to another, and even from one part of a crystal to another part of the same crystal.

A further difficulty is provided by biotite which is a member of the mica family, and like vermiculite, also breaks into the form of flakes. While the specific gravity of biotite is near 2.9 which is appreciably higher than that of vermiculite, its identically flaky shape makes it exceedingly difficult to separate from the vermiculite by gravity methods. Moreover, vermiculite and biotite sometimes appear together as mixed or interlayered crystals, in which circumstance utility will depend on the percentage of each component. These mixed and interlayered crystals further add to the difficulty of gravity separation of vermiculite from biotite.

Various attempts have been made to conduct the separation of vermiculite from its associated gangue by adaptation of a flotation process. In such separating processes, the ore or other mixture is finely ground and aerated while in suspension in an aqueous solution of controlled composition. This has the faculty of causing some solids to adhere to air while others remain wetted by the water, with the result that mineralized bubbles form and rise to the top of the separating vessel with their selected load, the froth overflowing the lip of the separating vessel while an underflow of different composition is taken away from another part of the separating vessel. One of the limitations of such flotation processes is the difficulty met in getting mixtures of dissimilar solids to behave differently in regard to any one selected chemical environment, and this difficulty has been significant where attempts have been made to apply the process to the separation of vermiculite from its gangue minerals, particularly pyroxene and biotite. A further limitation of the process arises from the size of solids that can be treated. Such processes are not usually suitable for separating solids coarser than about 0.5 to 1 mm. in size while the commercial grades of vermiculite which are of most interest range from 0.5 mm. to 10 mm.

In a modified form of the flotation process, often called agglomeration, the separative step is conducted on a shaking table, or other gravity-concentrating device. In this process, the ore is crushed to 3 mm. or finer, deprived of its extremely fine portion or slimes and mixed in a thick aqueous pulp with an appropriate chemical agent, such as a combination of a long-chained primary amine acetate and kerosene, which causes it to form with air bubbles loosely-bonded agglomerates. The resultant pulp is poured over a shaking table, and the agglomerated particles, because they are now both coarser and lighter, ride off the table as if the solids in them had a much reduced gravity and increased size. This effect is enhanced by a skin-floating effect akin to the behavior of a greased needle on water. Agglomeration tabling can be conducted with particles of a much coarser size than in the ordinary flotation process previously referred to, but few particles coarser than 6 mesh are recovered and the recovery is not readily reliable for particles above about 2 mm. in size. Furthermore, although by this process the vermiculite can be separated from most of the gangue with a fair degree of success, there still remains the problem of separating it from the pyroxene and biotite.

Thus, a first and principal object of the present invention is to provide new and improved means for separating the mineral vermiculite from the gangue minerals with which it is associated in the ore as mined.

We have discovered that vermiculite can be made to swell by a two-step procedure, which consists of immersing the vermiculite in certain saline solutions followed by rinsing and soaking in fresh water. The exact mechanism of the swelling is not known except that it can be considered to be osmotic. However the resultant volume expansion has been found to be very large and we have found it to be accompanied with a corresponding substantial decrease in specific gravity of the vermiculite. In the process, saline solutions of electrolytes, such as lithium chloride, sodium chloride, calcium chloride and magnesium chloride or magnesium sulfate have been found to induce much swelling in the subsequent rinsing and soaking steps, while salts of potassium and barium, although useful, produce less swelling. Aluminum sulfate, sulfuric acid and hydrochloric acid have also been found to cause swelling. Also, water miscible liquids such as glycerin and aqueous solutions of no-polar molecules such as dextrose and glucose can be used in place of the brine. In the case of neutral salts such as the mentioned alkali and alkaline earth chlorides, the mechanism we have noted is strictly a reversible osmotic swelling and the vermiculite concentrate returns to substantially its original specific gravity after washing and drying. However when acids such as hydrochloric or sulfuric or acid salts such as aluminum chloride or aluminum sulphate are used, the swelling is not reversible and the dried product tend to be considerably more bulky than the starting material. Moreover, we have noted, in the case of acidic solutions that the swelling occurs during the "brining" step and not during the washing step so that a different mechanism is involved. Moreover the vermiculite when treated with strongly acidic solutions to the extent found necessary to induce swelling undergo extensive chemical modification and lose their capacity for subsequent thermal exfoliation. Thus although the acid solutions are useful in accordance with the present invention to accomplish benefication, the neutral salt solutions have additional advantages and are therefore to be preferred.

We have further found that although the vermiculite mineral may be thus treated to decrease substantially its specific gravity, the salt treatment does not have a comparable effect on the various gangue minerals, such as asbestos, pyroxene, feldspars, quartz and biotite with which the vermiculite is associated, and we therefore propose to utilize this discovery to selevtively decrease the specific gravity of vermiculite while affecting much less, or not at all, the specific gravity of the associated ore minerals. By this means, many of the difficulties attendant to the afore-described separation processes which are dependent on differences of specific gravity between the vermiculite and its associate gangue minerals now disappear so that practical and efficient methods of recovering a relatively pure form of vermiculite in particle form can be had.

We have further found that the swelling also tends to increase the flakiness of the vermiculite so as to increase the difference in shape between vermiculite and gangue, thereby providing a further factor or difference which can be utilized in the separation processes.

Thus a further and principal object of the invention is to provide means and methods of selectively altering the specific gravity of the vermiculite mineral in the crude ore without affecting its associated gangue minerals, whereby it may be conveniently separated from said gangue minerals.

Still another object of the invention is to provide novel means and method by which the particle size and shape of the vermiculite may be altered so as to aid a more efficient and effective separation of the vermiculite from its associate gangue minerals.

Still another object of the invention is to selectively alter the size and shape as well as specific gravity of the vermiculite sufficiently to provide a sufficient spread between the physical characteristics including specific gravity of vermiculite and that of the associate gangue minerals whereby the ore may be conveniently and efficiently beneficiated or separated from such gangue minerals employing conventional devices for gravity separations, such as jig, tables, spirals, heavy-media tanks and the like.

Another important advantage of our invention is the fact that the process is not adversely affected by the presence of large quantities of clay or other types of fines. Rather our salt swelling process is an effective means of separating the vermiculite from such fines. In the past, the presence of clay and other fines has been particularly troublesome especially to those methods of separation using surface active agents in which cases, special processing had to be followed to separate the clay and other fines from the crude vermiculite before the surface active agent was added, otherwise a large fraction of the agent would go to the clay and be lost. In our process some salt may also be lost because of carry off by the discarded clay and fines, but to a considerably lesser degree. The amount thus lost is however not significant both because of the relatively low cost of the crude salt which is used in the process and also because of the fact that recovery of salt from the discards can be as efficient as economics may demand.

Many other objects as well as advantages of the process and resultant product will be at once, or will become, apparent from the more detailed description of the steps in the process which will now be described.

In the drawing the process contemplated by the invention is illustrated by the flow sheet constituting the only FIGURE thereof.

Referring to said figure, the vermiculite ore consisting of vermiculite in association with gangue is taken from the mines, crushed while still with its natural dampness and classified as to size (e.g. in a wet way), the fines being removed and oversize particles returned to the mill for further reduction. After drying or some other treatment designed to reduce the water content of the ore to an acceptable level, the ore or a selected and uniformly sized fraction of the ore is immersed in a brine solution of any of the mentioned salts or electrolytes, such as sodium chloride, calcium chloride, etc., or mixtures thereof, the ore particles being left in the solution for a time interval sufficient to allow penetration of the electrolyte within the ore particles. The brined ore particles are then recovered and the excess soaking brine liquor returned to storage where additional salt is added to make up that lost in the brining step. The recovered brined particles are then given a quick rinse, followed by soaking in fresh water for a suitable length of time to induce swelling. Preferably, the rinsing water which has picked up salt to form a relatively weak brine is also returned to storage for further use in the process. After soaking sufficiently, the swollen ore is then concentrated by one of several gravity processes to be hereinafter more completely described.

After separation from the gangue, the vermiculite particles may be dried in a kiln and stored until ready for the exfoliation furnace. Immediately before being heated to accomplish exfoliation, the particles may be subjected to the addition of moisture in the form of liquid water or of steam so as to increase the moisture content of the feed to the exfoliation furnace, to an optimun level, e.g. to at least 10% by weight of the particles, and then heated at elevated temperatures near 1800° F. until exfoliation occurs following the teaching of the pending application Serial No. 764,709 of John C. Hayes and assigned to our assignee.

Although swelling is much more rapid in the case of small particles, the process is also adaptable to the separation of coarse fractions of the ore, for example, such as vary from one inch to 6 mesh. After the separating step and before being subjected to the exfoliating furnace, if desired, the coarse fraction can be milled to further reduce the size of the particles.

When ore containing vermiculite is placed in a strong brine solution, the electrolyte penetrates not only the cracks and cleavages existing in the vermiculite, but, it is believed, also the inner structure thereof but not necessarily into the ultimate atomic layers of the crystallographic unit cell. During the salting step which may last from a few minutes to several hours in accordance with the size of the particles in the charge, little or no change will be noted in specific gravity, but on rinsing, swelling commences almost immediately, and will occur even when the ore is passed quickly through the rinsing step. Following rinsing, the salted ore is soaked in water from a few to several hours. This stage is marked by swelling, rapid at first and then slower, until a practical maximum swelling has occurred. In some instances, the measured volume increase of vermiculite has been as much as four or fivefold, although expansion to threefold or less is more rapidly obtained. Swelling is accompanied by ingestion of water which seems to be drawn into the vermiculite by osmotic forces. Examination of the swelled particles reveals an appreciable increase in the volume of the grains of vermiculite which characteristic is not noted in the gangue portion. Since the water inside the swollen grain of vermiculite does not have free passageways into and out of the vermiculite, the average mineralogical density of the individual particle is reduced. Because the volume of the particles has been increased by water having a density of 1 as compared to the density of vermiculite itself (2.3 to 2.7), the density of the swollen vermiculite is correspondingly reduced in accordance with the volume increase of water. The swollen vermiculite has a visibly different appearance from the untreated mineral in that it is much paler in color, and a beautiful golden brown shade results from a dull brownish-black unswelled mineral. The faces of the flakes are smoother and flatter, and the volume of the swollen flakes can be greatly reduced by pressing the flakes between ones fingers. This is obtained even if only moderate pressure applied. The gangue minerals do not swell measurably by the aforesaid salt treatment, so that they retain their normal specific gravities as pointed out above while the specific gravity of vermiculite by reason of the volume increase can be made to drop to 1.5 or even to 1.4 and below.

Where locked particles, viz particles consisting of more than one crystal species, have been exposed to salt swelling, some autogenous liberation is noted. There is also a favoring of liberation on application of a modest force for comminution.

The effect of the swelling action on the specific gravity of vermiculite is well illustrated in the following table where it is compared to biotite:

Table A

| Original Secific Gravity of Biotite—Vermiculite | Specific Gravity after Osmotic Swelling | Percent Change In Specific Gravity |
| --- | --- | --- |
| 3.00 (substantially pure biotite mica) | 3.00 | none |
| 2.90 | 2.80 | 03.4 |
| 2.80 | 2.40 | 14.3 |
| 2.70 | 2.10 | 22.3 |
| 2.60 | 1.90 | 26.9 |
| 2.30 | 1.70 | 26.1 |

The above data were obtained by treating batches of various mica samples with a saturated sodium chloride solution for two hours, followed by a thorough rinsing in water heated to 150° F. and a final soaking in water of similar temperature for a period of thirty minutes. The specific gravity data on individual representative flakes were measured by the use of a sink-float method in heavy liquids.

Since most of the known vermiculite deposits contain relatively large quantities of biotite mica along with quartz, the above described salt treatment affords a convenient practical solution to the problem whereby biotite flakes can be readily separated from the vermiculite even though in their untreated stages they have many similar characteristics, including flake shape and nearness of specific gravity.

The salting step is most effectively carried out in a very strong brine, e.g., a saturated brine, but a saturated brine is not absolutely essential, and notable swelling can be obtained with a brine that is only half saturated or even of weaker concentration. Nevertheless, the strength of concentration of the brine is the most important single factor making the process operative, and where weaker solutions are employed, correspondingly longer standing time in the brine will be required.

The salt forming the brine is advantageously common salt, but alkali metal or alkaline earth metal salts other than sodium chloride which are soluble in water can be used, for example, magnesium chloride, magnesium sulfate, lithium chloride, and sodium fluoride. Calcium chloride is particularly useful and has an advantage over sodium chloride in that its solubility in water is greater at elevated temperatures than at room tempertures. Consequently if the solution is heated, and additional sodium chloride is added to maintain saturation, its capacity for inducing swelling will be enhanced and the length of time for brining with saturated solutions of calcium chloride will diminish very rapidly as temperature is raised. The solubility of sodium chloride on the other hand is not substantially affected by raising the temperature thereof so that little advantage is gained by brining with common salt at elevated temperatures.

Other factors affecting the result include the initial dampness of the ore, the size of the ore particles, the temperatures at which the operation is conducted, the length of time of brining, the extent of rinsing, and the time allowed for swelling. Generally speaking, starting with a very damp ore will be a disadvantage, since this is broadly equivalent to using a more dilute brining solution. A coarse ore is also more difficult to brine and swell evenly, but this can be compensated by allowing longer times for brining and also swelling, or by using stronger concentrations of electrolyte in the initial brining step. There is also some advantage in operating at temperatures slightly above room temperature as at near 150° F. Although increasing the time of brining usually results in better salt penetration and more swelling, relatively short times (one to four hours) for the brining are usually sufficient.

The rinsing step has been found to be relatively unimportant from the standpoint of the swelling obtained, although it does have its significance from a point of economics in making possible the reuse of salt not consumed by the initial batches of vermiculite ore treated. Substantially all the swelling occurs during the soaking step, and this conceivably could be accomplished by simple dilution of the brine solution through the addition of large quantities of water where recovery of salt is not significant. Generally, a day or two is required to obtain maximum swelling in fresh water, but soaking for even a few hours may be considered sufficient under circumstances dependent, for example, on the size of the particles, and/or the batch and amount of water used for soaking and also the temperature thereof.

Although thus far we have referred to swelling by salting the crude vermiculite ore with a saturated or near saturated brine solution it is also possible to induce swelling by adding dry salt to moist or wet vermiculite as for example in the surge tank storage or stock piles between the mine feed and the intake of the beneficiation mill, allowing the mixture to stand long enough for the salt to dissolve into the superficial layer of moisture that surrounds each ore particle and by diffusion to enter the vermiculite. To illustrate the swelling of the vermiculite which can be obtained in this way, 1 cu. ft. of Libby #1 vermiculite ore having a 10% moisture content was tumbled in a 4 cu. ft. concrete mixer with .3 cu. ft. of common salt previously ground to 50 mesh size. After tumbling for 15 minutes an additional 10% of water was added and mixed for another 15 minutes. The mixture was allowed to stand for 1 hour and then washed with 150° F. water. After 5 minutes of washing substantial swelling was noted and within 1 hour the vermiculite had swelled 56%.

In separating the swelled vermiculite from the non-swelled gangue, several methods of separating can be used to great advantage. One method modeled after that employed in coal cleaning would consist in subjecting the mixture of particles to an ascending current of water, the speed of which is regulated so that the lighter vermiculite particles overflow while the heavier gangue particles sink. If the size range of particles to which the swelling step has been applied is too great in proportion to the lessening in specific gravity of the swelled particles, the separation by classification may be imperfect, and in which case combination of the process with screening will provide better results.

A second gravity method involves the use of a jig such as, for example, any of those which are described in Chemical Engineers Handbook, by McGraw-Hill Book Company, Inc., 1950, beginning on page 1075 or those described in Richards and Locke, Textbook of Ore Dressing, McGraw-Hill Book Co. (1940). Most of these devices involve either a stationary or vertically movable sieve mounted in a tank through which water is forced to achieve a separation between materials of different specific gravities as by the pulsation of a stream of liquid flowing through a bed of the materials. Thus in this method the particles are flowed onto a screen to form a stratified bed and as the liquid pulsates or "jigs" up and down through said bed the heavier material is caused to work down to the bottom of the bed and the lighter material to rise to the top, whereby the lighter swollen vermiculite will form a relatively loose upper stratum and the heavier gangue minerals will form a relatively compact lower stratum and/or pass into the hutch of the jig. Both strata or both strata and the hutch product may be then drawn off separately to yield a concentrate consisting of essentially pure vermiculite free of gangue and a reject highly depleted in vermiculite by comparison. Operation of such a jig in the concentration of vermiculite ore is more particularly described in our assignee's United States Patent No. 2,868,735 issued to John B. Myers, January 13, 1959, where a process is described for increasing the yield of unexpanded vermiculite through delamination in the jigs.

In our experiments, using a five foot long jig, we have found the vermiculite and gangue to form into separate beds in as little travel down the jig as one foot. One of the limitations of the jigging process in the past has been the inability to get a clean fraction of vermiculite at the end of the jig. In other words, even though a clean line of separation between the upper layer of vermiculite and lower layer of gangue might exist on the jig, it was not possible to cut off the upper vermiculite layer without either taking some of the gangue material with it, or, as would be the more usual practice, to leave some of the vermiculite with the gangue. However, when utilizing the salt swelled material, the bed of vermiculite is much deeper so that a much larger fraction of concentrate can be cut off. The thicker bed results, first, because the swelling of the vermiculite increases the relative proportion of vermiculite on a volume basis to the heavier gangue which does not change in volume. Secondly, the bed is thicker because reduction of specific gravity of the vermiculite particles adds to their buoyancy, making a bed of concentrate having a greater fluidity, that is, with more water between the particles. Obviously, also because of the now greater difference in specific gravity from the swelled vermiculite, the gangue minerals form a more firm, compact bed. Then too, because of the greater difference in specific gravity between the vermiculite and gangue minerals the forward component of velocity of the gangue mineral exceeds that of the lighter vermiculite; hence the vermiculite bed tends to have its depth increased while the gangue mineral layer is decreased.

A third gravity method depends on the use of a suspension of a heavy medium, such as of fine sand, fine magnetite or ferrosilicon in water, this suspension instead of water comprising the separating medium. This acts like a heavy liquid and provides excellent separation of the swelled feed from the unswelled gangue, as float and sink products, respectively.

A fourth gravity method is to use shaking tables; spirals or vanners or other flowing-film concentrators. Whereas on untreated ore, the separations have been poor at best, very good results have been obtained in separating the swelled, lower-density vermiculite.

A further gravity method which has been found to be useful in recovering the swelled vermiculite involves the use of a low-pressure or open-head liquid cyclone which requires a minimum of 0.5 specific gravity difference between the materials to be separated in order to operate with any degree of success. However, as noted above, by the salt swelling process the specific gravity difference of vermiculite from gangue can be easily increased to much more than a difference in specific gravity of 0.5, whereby good separations can be obtained following this particular procedure.

Flotation separation can also be used with startlingly good results. For example, a swollen pulp of the material can be treated as for agglomeration tabling, with in fact an appreciably lower quantity of agents than are required for agglomeration tabling on unswelled feed, and at the same time obtaining considerably improved results by way of purer vermiculite. In this case, the agglomerated and skin-floating vermiculite seems to come off as freely as the wash water, leaving on the table a wedge-shaped region between the vermiculite and gangue that is wholly devoid of solids. Equally startling behavior by froth flotation is obtained on pre-swollen fines of vermiculite ore, but in this case, the economic justification is less persuasive, since fine vermiculite is usually thought to be much less valuable than the coarser varieties. Actually, good separations have been obtained by this process when applied to vercimulite particles up to about 4 mm. in size, which is double the usual maximal size separable dependably by table agglomeration.

To illustrate the process an experiment was conducted in the laboratory using two ores. One sample was a South Carolina deposit of vermiculite ore of No. 2 particle size containing about a 53% rock contamination. The other sample was a Montana mined ore of No. 4 particle size containing about 14% rock contamination. Samples of the two ores were soaked for 48 hours in saturated sodium chloride solutions, then washed with tap water until the washings gave no indication of salinity by taste. They were then allowed to stand in fresh water for an additional 48 hours. During the fresh water soaking period both salt treated ores swelled sufficiently to produce overall bed expansions in the order of 75% by volume.

All ore samples, both the treated and controls, were then put through a laboratory type one stage vertical hydraulic classifier and the following results were obtained.

| Ore Sample | Rock Content of Original Ore, Percent by Weight | Rock Content of Concentrate after Classification, Percent by Weight |
| --- | --- | --- |
| Montana No. 4 (control) | 14.4 | 14.3 |
| Montana No. 4 (salt treated) | 14.4 | 3.2 |
| So. Carolina No. 2 (control) | 53.4 | 45.2 |
| So. Carolina No. 2 (salt treated) | 53.4 | 24.4 |

Although the type of classifier used in the above experiment is the simplest type to construct in a laboratory for small scale experimentation, it is not ideal for emphasizing the effect of specific gravity since separation of ore and gangue results from particle size as well as specific gravity characteristics. This is evident in the above data. The No. 4 ore contained an appreciable amount of rock finer than 65 mesh (particles less than 0.2 mm. in diameter). About 67% of the rock that was found in the ore concentrate after classification in the case of the salt treated No. 4 ore was finer than 65 mesh. Only about 20% of the rock found in the corresponding fraction of the untreated ore was in this size range. If the hydraulic classifier had been designed more efficiently, or if the hydraulic classifier had been followed by a step involving some type of classifier which could utilize more efficiently the induced specific gravity differences between ore and gangue, the separation would have been more complete. The results of the rather crude experiment however do give an indication of the improved results which may be obtained utilizing our invention.

Moreover in subsequent pilot plant operations utilizing a Hancock type jig with a movable sieve, further improvements were noted where vermiculite crude feed stock was swelled by the process of our invention. The following table gives typical differences in the effectiveness of the same jig in separating two 1000 pound portions of a one ton sample—one 1000 pound sample having received the salt swelling treatment and the other 1000 pound sample having received no treatment.

|  | Salt treated Feed Stock in Lbs. | Untreated Feed Stock in Lbs. |
| --- | --- | --- |
| Original Weight of Sample | 1,000 | 1,000 |
| Concentrate Fraction: |  |  |
| Vermiculite | 375 | 310 |
| Rock | 35 | 40 |
| Middling Fraction: |  |  |
| Vermiculite | 75 | 130 |
| Rock | 80 | 145 |
| Reject Fraction: |  |  |
| Vermiculite | 20 | 30 |
| Rock | 415 | 345 |

As a consequence of our process, it will be obvious that not only does the concentrate represent a considerably higher recovery of the vermiculite in the ore stream, but also that a much higher grade of concentrate is recovered, the same being practically devoid of rock particles or gangue. It appears also that the vermiculite tends to become somewhat delaminated during the swelling and subsequent handling in the separation steps, with the result that the net thickness of the flakes on a dried basis is, on the average, substantially less than in the case of concentrates made by traditional ways from unswelled vermiculite particles. The delamination is also accompanied with a minimum of transgranular fracturing—much less than would be incurred if the same amount of delamination were sought on unswelled ore. Moreover the significant increase in volume which takes place during the swelling process is only temporary since the swelling phenomena utilized to accomplish the beneficiation is almost completely reversible and depends on the presence of the water needed for the osmotic process. When dried, the vermiculite concentrate is only slightly bulkier than concentrates obtained by former methods.

Furthermore, as disclosed in the aforementoined copending application of John C. Hayes, Serial No. 764,709, it has been found that as a result of the salt swelling step, the temperature at which subsequent exfoliation of the vermiculite is obtainable can be considerably lower. Thus economy in expansion is obainable, first, because of the greater purity of vermiculite concentrates, and second, because of the peculiar characteristic of size and shape of flakes.

As previously pointed out above, it has been exceedingly difficult to separate the vermiculite mineral and the biotite mica. In fact, it has been difficult to visibly distinguish between the two minerals, since from a crystallographic standpoint, they are alike except for the fact that anhydrous potassium ions in biotite take the place of hydrated calcium or magnesium ions in the vermiculite. However, since the aforedescribed swelling process swells vermiculite readily whereas the biotite is not swelled, the process provides a simple convenient way in which separation between high quality and modest quality vermiculites or between modest quality and poor vermiculites can be had, and which is wholly unattainable without the salt swelling step. Thus beneficiation can be accomplished by swelling a selected size of particles of the vermiculite biotite mixture according to the procedure described, and recovering those particles which exhibit maximum swelling while rejecting particles which do not swell or swell less than a given value.

Since the resultant product, by kiln drying to remove or at least reduce its moisture content, can be made to return to substantially its original density, the kiln dried product can be shipped to the exfoliating centers as conveniently as can vermiculite that has been processed by prior methods. At the same time it is not only much more free of gangue but is in a condition ready for the exfoliation treatment taught in the aforementioned John C. Hayes copending application by the addition of moisture. Thus the product obtained by our invention will have a sodium content in excess of normal by from ¼ to 3% or more if the rinsing step has been limited. It is in the sodium form as far as possible ion exchange uses are concerned and the dried vermiculite particles retains a "golden" or lighter color as compared with concentrates of vermiculite obtained by methods other than our above described osmotic process.

It further will be understood that the described process in its broad sense can be applied to the separation of other materials than vermiculite from the gangue with which it is associated in the crude ore. For example ground rubber may be separated from a mixture thereof with ground fibers by adding a hydrocarbon such as benzene which causes the rubber alone to swell. The swelling of the rubber changes its specific gravity sufficiently to permit its separation by flotation from the unchanged ground fibers. Many other applications of the invention will also suggest themselves or be suggested in the light of the preceding discussion and teachings.

Thus it will be apparent that all of the objects and advantages of the invention have been described as obtainable in a convenient, simple, practical manner.

Having described our invention, we claim:

1. A process of concentrating vermiculite ore to separate the vermiculite from gangue with which it is associated in the ore, comprising the steps of contacting vermiculite crude ore particles containing gangue with a brine solution until salt from said solution has penetrated the vermiculite portion of the ore particles, then soaking the crude ore particles in water to cause swelling of the vermiculite only; and separating the swelled vermiculite from the gangue.

2. A process of beneficiating vermiculite crude ore to separate the vermiculite from gangue with which it is associated, comprising the steps of reducing the ore to particles of desired size, contacting the ore particles with a brine solution to permit penetration of the vermiculite portion of the ore particles by salt from said solution, then adding water to cause swelling of the vermiculite ore only, recovering the brine solution, and then separating out the swelled vermiculite from the gangue portion of the reduced ore.

3. A process of beneficiating vermiculite ore in order to separate the vermiculite portion from the gangue portion thereof having a specific gravity approaching that of the vermiculite, comprising the steps of reducing the ore to particulate form, immersing the particulated ore in a saline solution to obtain penetration of salt from said solution into the vermiculite portion of the ore particles, then swelling the vermiculite by the addition of water thereto to lower the specific gravity of the vermiculite, the gangue being unchanged in specific gravity by said treatment, and then separating by gravity the lower specific gravity swelled vermiculite from the gangue.

4. A process of treating vermiculite ore containing gangue comprising the steps of reducing the ore to particulate form, contacting a selected particle-sized fraction thereof with an aqueous solution of electrolyte sufficient to obtain penetration of the particles with said electrolyte, adding moisture to said electrolyte penetrated particles to cause swelling thereof, the electrolyte penetration and swelling being confined substantially to the vermiculite portion of said particles, separating the electrolyte penetrated and moisture swollen particles by gravity from the gangue which does not swell, and heating the separated vermiculite particles at elevated temperatures until exfoliation occurs.

5. A process according to claim 4 wherein the solution of electrolyte comprises a strongly concentrated solution of sodium chloride.

6. A process of treating vermiculite ore to separate the vermiculite from its associated gangue in the ore having specific gravity values near that of the vermiculite comprising the steps of immersing a graded mesh size of ore particles in an aqueous solution of salt to obtain penetration of the vermiculite portion by said salt solution, the gangue being substantially unpenetrable thereby, rinsing the particles with fresh water and allowing the particles to stand in fresh water sufficient to cause the salt penetrated vermiculite portion to take in water and temporarily swell in volume severalfold, the gangue being substantially unchanged in volume, thereafter separating by gravity the swelled vermiculite from the gangue, and then drying the vermiculite so as to return it to substantially its initial dense form.

7. A process according to claim 6 in which the unused portion of the salt solution and rinse water are recovered, additional salt is added thereto to restore the solution to its original strength and used in immersing further amounts of vermiculite ore to continue the process.

8. A process according to claim 6 wherein the salt solution is sodium chloride in water.

9. A process practiced according to claim 6 wherein the gangue includes biotite.

10. A process of concentrating vermiculite ore to separate the vermiculite from gangue with which it is associated in the ore, comprising the steps of contacting vermiculite crude ore particles with a water miscible liquid which will penetrate the vermiculite and not the gangue, said liquid having the characteristic of causing the vermiculite to swell when soaked in water, and, after the particles have been penetrated by said liquid, soaking the particles in water until a desired swelling of the vermiculite occurs, and separating the swelled vermiculite from the gangue.

11. A process according to claim 10 wherein the water miscible liquid comprises an aqueous solution of nonpolar molecules.

12. A process of concentrating vermiculite ore to separate the vermiculite from gangue with which it is associated, said process comprising the steps of adding a neutral salt from the group consisting of alkali metal salts and alkaline earth metals to moistened vermiculite crude ore particles containing gangue, then soaking the crude ore particles in water until swelling of the vermiculite occurs, and then separating the swelled vermiculite from the gangue.

13. A process according to claim 12 wherein the neutral salt is calcium chloride.

14. A process according to claim 12 wherein the neutral salt is sodium chloride.

15. The process of increasing the flakiness of the vermiculite components of crude ore composed of vermiculite and gangue and thereby increasing the difference in shape between the vermiculite particles and the gangue which comprises contacting the said crude ore with a brine solution until penetration of the ore particles occurs, soaking the crude ore particles in water to cause swelling and to effect an increase in the flakiness of the vermiculite particles, and then separating the swelled flaky vermiculite from the gangue.

References Cited in the file of this patent

UNITED STATES PATENTS

| | | |
|---|---|---|
| 1,972,390 | Miner | Sept. 4, 1934 |
| 1,987,221 | Stroehlke | Jan. 8, 1935 |
| 2,030,239 | Byers | Feb. 11, 1936 |
| 2,531,975 | Essex | Nov. 28, 1950 |
| 2,828,860 | Morris | Apr. 1, 1958 |
| 2,868,735 | Myers | Jan. 13, 1959 |
| 2,898,303 | Houston | Aug. 4, 1959 |

OTHER REFERENCES

"Vermiculite Chemical and Physical Properties," Zonolite Company, 1954, page 6.